(12) United States Patent
Saitou et al.

(10) Patent No.: US 8,355,524 B2
(45) Date of Patent: Jan. 15, 2013

(54) MAGNETIC CIRCUIT

(75) Inventors: Shigeo Saitou, Chuo-ku (JP);
Mitsutoshi Tanaka, Chuo-ku (JP);
Kouji Mitake, Chuo-ku (JP)

(73) Assignee: TDK Corporation, Tokyo (JP)

( * ) Notice: Subject to any disclaimer, the term of this patent is extended or adjusted under 35 U.S.C. 154(b) by 419 days.

(21) Appl. No.: 12/801,491

(22) Filed: Jun. 11, 2010

(65) Prior Publication Data

US 2010/0254565 A1    Oct. 7, 2010

Related U.S. Application Data

(62) Division of application No. 11/519,010, filed on Sep. 12, 2006, now Pat. No. 7,757,376.

(51) Int. Cl.
*H04R 1/02* (2006.01)
*H04R 9/06* (2006.01)
*H04R 11/02* (2006.01)

(52) U.S. Cl. ........ 381/421; 381/405; 381/412; 381/414; 381/419; 381/420; 381/422; 381/423; 335/229; 335/230; 335/302; 335/306

(58) Field of Classification Search .......... 381/405, 381/412, 414, 419, 420, 421, 422, 423; 335/229, 335/230, 302, 303, 304, 305, 306
See application file for complete search history.

(56) References Cited

U.S. PATENT DOCUMENTS 7,529,381 B2 * 5/2009 Kaneda et al. ............... 381/403

* cited by examiner

*Primary Examiner* — Vivian Chin
*Assistant Examiner* — Paul Kim
(74) *Attorney, Agent, or Firm* — Manabu Kanesaka

(57) ABSTRACT

A magnetic circuit includes a cylindrical yoke member having an inner circumferential surface and a collar formed at one end thereof and turned back substantially at right angles, and a plurality of permanent magnet segments of a partially circular arc in cross section. Each of the permanent magnets has an outer surface attracted magnetically to the inner circumferential surface of the cylindrical yoke member, and one end face attracted magnetically to the collar of the cylindrical yoke member. The magnetic circuit is applied to an actuator or a speaker.

8 Claims, 10 Drawing Sheets

FIG. 1 (a)
FIG. 1 (b)
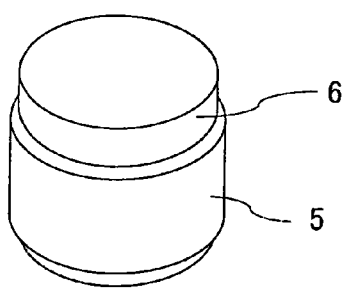
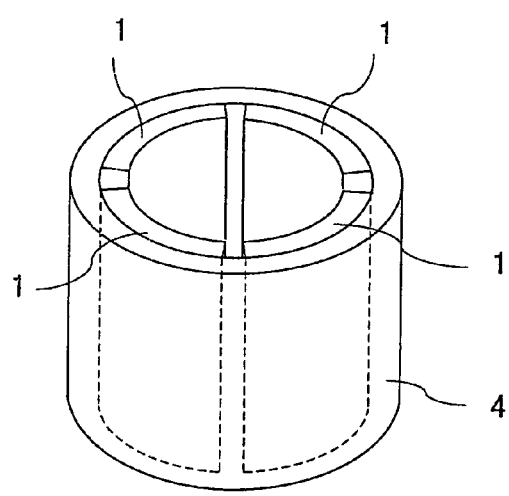
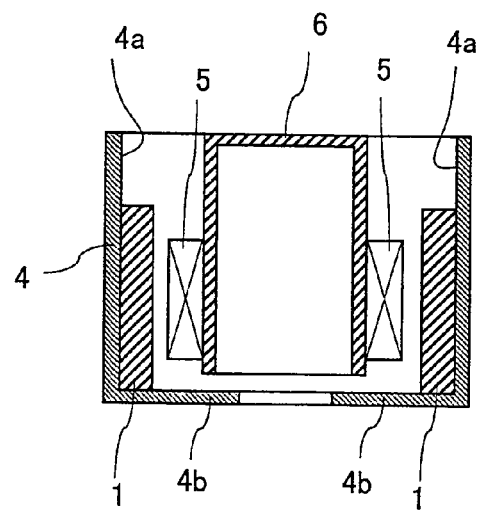

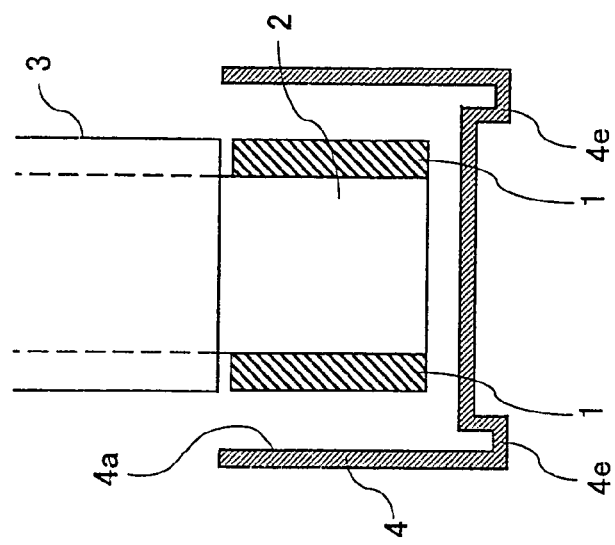
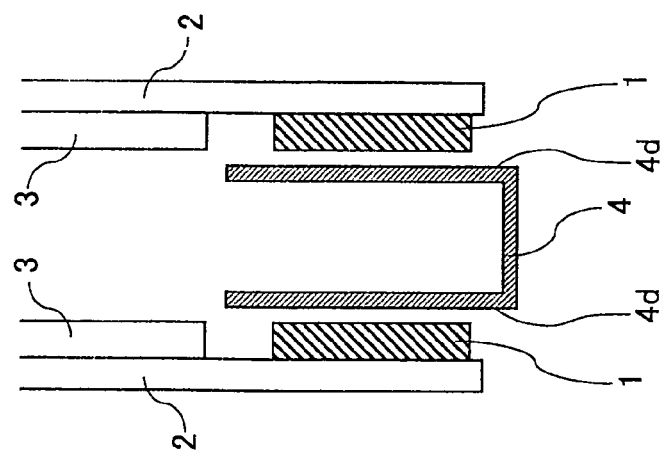
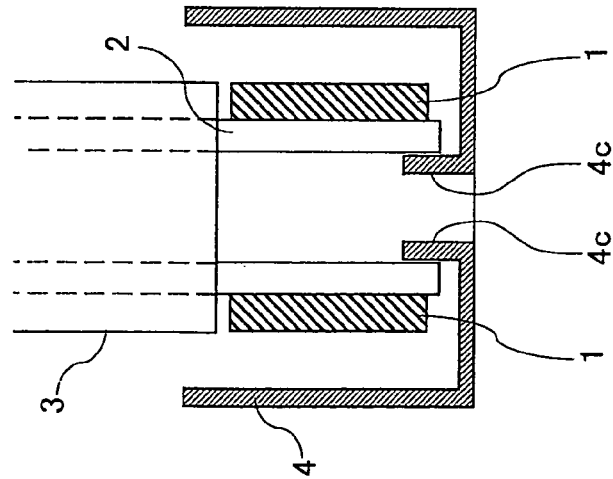
FIG. 7 (a)  FIG. 7 (b)  FIG. 7 (c)

MAGNETIC CIRCUIT

CROSS-REFERENCE TO RELATED APPLICATION

This is a divisional application of Ser. No. 11/519,010 filed on Sep. 12, 2006 now U.S. Pat. No. 7,757,376.

BACKGROUND OF THE INVENTION

1. Field of the Invention

The present invention relates to a magnetic circuit for use in a magnet-aided actuator for converting electric energy to kinetic energy etc. It further relates to an actuator or speaker using the magnetic circuit.

2. Description of the Prior Art

For various kinds of office automation equipment, linear motors (voice coil motors), controllers, etc., for example, actuators of a variety of types have been developed. Concrete examples include an actuator having a magnetic coil and a magnetic core made movable and an actuator having a permanent magnet movable. In either case, the actuator comprises a yoke, a magnetic coil and a permanent magnet in combination.

Actuators using a permanent magnet have encountered problems as to how control precision is to be made high and how impellent is to be enhanced. Attempts have been made to solve the problems through modifications of the structures of the actuators. As a high-precision controllable actuator, for example, there has been proposed a linear actuator comprising an outer yoke and an inner yoke each having a magnetic coil wound around it and a cylindrical permanent magnet magnetized in the radial direction (refer, for example, to JP-A HEI 6-284670). A linear actuator comprising a side yoke, a first permanent magnet of a given polarity and a second permanent magnet of the opposite polarity, has been proposed as an actuator capable of enhancing the impellent (refer, for example, to JP-A HEI 5-49226).

The former prior art adopts the configuration in which the pair of outer yoke and inner yoke each having a magnetic drive coil would around it are coaxially disposed using a spacer, the cylindrical permanent magnet supported on a magnet holder and magnetized in the radial direction is disposed as a movable member between the magnetic drive coils, and an output shaft piecing through the axis portion of the inner yoke is connected to the magnet holder. According to this prior art, this configuration makes it possible to provide a linear actuator exhibiting highly precise controllability and enabling miniaturization and lightweight and higher versatility.

In the latter prior art, a hollow cylindrical permanent magnet is affixed onto the inner circumferential surface of the side yoke formed in a bottomed hollow cylindrical shape from a ferromagnetic material and, at the same time, a cylindrical center yoke made from a ferromagnetic material is disposed coaxially with the side yoke on the bottom of the side yoke in a projecting manner, thereby configuring a magnetic circuit. This prior art has a structure in which an axially movable member is disposed in a magnetic void defined between the permanent magnet and the center yoke. The permanent magnet comprises the first permanent magnet extending from the bottom of the side yoke to the neighborhood of an opening and the second permanent magnet magnetized to have a polarity opposite to that of the first permanent magnet and provided in the vicinity of the opening. By providing a drive coil and a detection coil, with the movable member facing the first and second permanent magnets respectively, it is made possible to materialize a linear actuator small in size, light in weight, enhanced in impellent and high in linearity and reliability.

While each of the former and latter prior art references uses a cylindrical permanent magnet in a magnetic circuit constituting an actuator, a rare earth sintered magnet exhibiting high magnetic intensity is formed into a cylindrical permanent magnet only with great difficulty from the manufacturing point of view.

Generally, a rare earth sintered magnet is produced by the powder metallurgy method comprising the steps of compact-molding raw alloy material in a magnetic field into a cylindrical shape and subjecting the compacted body to sintering and aging treatments. In this case, the compacted body is liable to be shrunk and deformed during the process of the sintering treatment. When such shrinkage arises, circularity is lowered to require polishing for adjustment of the outside and inside diameters before incorporating the magnet into the actuator, thus inducing an increase in man-hour and manufacturing cost. When the shape of the magnet is made cylindrical, since the volume relative to the weight becomes large, the number of the magnets to be treated at a time will be decreased to increase the sintering cost.

Though a difference is made depending on the structure of a magnetic circuit, where the dimensional accuracy in outside and inside diameters of a cylindrical rare earth sintered magnet is low when it is intended to affix the magnet to a yoke, the area of the magnet in contact with the yoke becomes substantially very small. As a result, the force of affixing the magnet to the yoke is considerably diminished to possibly necessitate concomitant use of affixation by an adhesive. Furthermore, a problem will arise when magnetizing the magnet. Specifically, a magnetizing apparatus large in size has to be used for the cylindrical magnet when magnetizing the magnet either before or after the magnet is affixed to the yoke.

Also in addition thereto, a cylindrical permanent magnet used in a magnetic circuit of an actuator generally has an orientation in the direction of diameter (a so-called radial orientation). A cylindrical rare earth sintered magnet having the radial orientation, when being formed in a small wall thickness, for example, sustains cracks or chips during the process of sintering, resulting in tendency to greatly lower the yield. This decrease in yield constitutes a serious cause of preventing an actuator from having high performance and from being miniaturized.

In view of the conventional state of affairs described above, the present invention has been proposed. An object of the present invention is to provide a magnetic circuit capable of materializing its high-performance property and miniaturization property without encountering any difficulty during the course of the manufacture thereof even when a rare earth sintered magnet is used as a permanent magnet. Another object of the present invention is to provide a method and apparatus for efficiently manufacturing the magnetic circuit. Still another object of the present invention is to provide an actuator and a speaker each having the magnetic circuit incorporated therein to attain its high-performance property.

SUMMARY OF THE INVENTION

To attain one of the above objects, the present invention provides a magnetic circuit comprising a cylindrical yoke member having an inner circumferential surface and a collar formed at one end thereof and turned back substantially at right angles, and a plurality of permanent magnet segments of a partially circular arc in cross section having respective outer surfaces attracted magnetically to the inner circumferential surface of the cylindrical yoke member and respective one end faces attracted magnetically to the collar of the cylindrical yoke member.

To attain another object, the present invention provides a method for the manufacture of a magnetic circuit, comprising the steps of magnetically attracting a permanent magnet segment of a partially circular arc in cross section to an outer periphery of a center rod, causing the magnet segment in a magnetically attracted state to face a yoke member, using a nonmagnetic supporter to regulate the magnet segment in position, extracting the center rod from the magnet segment in a position-regulated state and magnetically attracting and fixing the magnet segment to the yoke member.

An apparatus for the manufacture of a magnetic circuit, comprising a center rod formed of a magnetic material and having an outer peripheral surface to which a permanent magnet segment of a partially circular arc in cross section is attracted and a nonmagnetic supporter assuming a ring shape and disposed around the outer peripheral surface of the center rod and coaxially with the center rod, wherein the center rod is insertable into and detachable from the nonmagnetic supporter.

First of all, the fundamental idea of the present invention lies in not use of a cylindrical permanent magnet, but use of permanent magnet segments having a partially circular arc in cross section (hereinafter referred to as C-shaped permanent magnet segments) into which a cylindrical shape is divided at a predetermined angle and a combination of the permanent magnet segments into a substantially cylindrical shape.

The C-shaped permanent magnet segments are easy to manufacture even in the case of using rare earth sintered magnets. Since the segments formed even in a small thickness sustain few cracks or chips during the process of sintering, they can be manufactured at high yield. Deformation thereof during the process of sintering can be suppressed to a great extent as compared with cylindrical magnets. Also, since the C-shaped permanent magnet segments can be stacked in their thickness direction, they can be magnetized in a lump to shorten the magnetization time to a great extent.

These C-shaped permanent magnet segments are magnetically attracted to the yoke member to configure the magnetic circuit of the present invention. Mere magnetic attraction of the permanent magnetic segments to the inner circumferential surface of a cylindrical yoke, for example, still brings to anxiety about the state in which the permanent magnet segments have been fixed to the yoke. In the present invention, therefore, the yoke is provided at one end thereof with a collar which is turned back substantially at right angles and to which the end faces of the permanent magnet segments are to be magnetically attracted. With this, the segments become in the firmly fixed state even without use of an adhesive agent and, and the entire structure thereof is strong enough to endure vibration resulting from its fall etc. Using rare earth magnets, particularly R-T-B-based rare earth sintered magnets to be described later, in the present invention proves to be effective because of very high magnetic intensity.

On the other hand, in the magnetic circuit using the C-shaped permanent magnet segments, in order to form a cylindrical magnet, for example, a plurality of C-shaped permanent magnet segments have to be combined to increase the number of magnet segments to be treated and possibly make the incorporation thereof into a yoke member cumbersome and complicated. Since the magnet segments are attracted to or repelled by each other, it is hard enough to dispose the segments accurately in position and in combination.

In the present invention, therefore, the incorporation of the permanent magnetic segments into the yoke member is implemented utilizing the magnetic attraction to the center rod and the release of the magnetic attraction resulting from the extraction of the center rod. The present invention adopts the following procedure. To be specific, a center rod formed of a magnetic material is set in position. C-shaped permanent magnet segments magnetized in advance in the thickness direction, for example, are magnetically attracted to the peripheral surface of the center rod. When combining the C-shaped permanent magnet segments into a cylindrical shape, for example, plural C-shaped permanent magnet segments are attached to the peripheral surface of the center rod and, in this state, the C-shaped permanent magnet segments are caused to face the inner circumferential surface of a yoke member. Subsequently, a nonmagnetic support is used to regulate the positions of the C-shaped permanent magnet segments without being moved and the center rod is extracted. As a result, the magnetic attraction exerted between the C-shaped permanent magnet segments and the center rod is released to bring the C-shaped permanent magnet segments to a free state. At this time, the magnetic attraction is exerted between the yoke member formed of a magnetic material and the C-shaped permanent magnet segments to attract the C-shaped permanent magnet segments to the inner circumferential surface of the yoke member and fixed thereto by means of the magnetic attraction.

By the simple operation of the magnetic attraction of the C-shaped permanent magnet segments to the center rod and the insertion of the center rod into and extraction thereof from the yoke member, plural C-shaped permanent magnet segments can be accurately positioned and magnetically attracted and fixed to the yoke member. Therefore, insertion of the magnet segments into the yoke member can continuously be performed for a short period of time and, after the insertion, it is unnecessary to magnetize the magnet segments.

The magnetic circuit of the present invention having the configuration mentioned above is applicable to actuators or speakers, for example, to materialize high-performance actuators or speakers. That is to say, the actuator of the present invention generates an actuating force by means of the magnetic circuit and a drive coil in cooperation with each other. The magnetic circuit is configured such that the plural permanent magnet segments of a partially circular arc in cross section are magnetically attracted to the inner circumferential surface of the cylindrical yoke member having at one end thereof the collar turned back substantially at right angles and such that the end faces of the plural magnet segments are magnetically attracted to the collar.

The speaker of the present invention vibrates a diaphragm joined to a voice coil by means of the magnetic circuit and the voice coil in cooperation with each other. The magnetic circuit is configured such that the plural permanent magnet segments of a partially circular arc in cross section are magnetically attracted to the inner circumferential surface of the cylindrical yoke member having at one end thereof the collar turned back substantially at right angles and such that the end faces of the plural magnet segments are magnetically attracted to the collar.

According to the magnetic circuit of the present invention, since not a cylindrical permanent magnet, but the C-shaped permanent magnet segments are incorporated, difficulty in producing a cylindrical permanent magnet, particularly a cylindrical rare earth sintered magnet, can be eliminated. Also, use of the magnetic circuit enables an inexpensive and high-performance actuator or speaker to be materialized. Furthermore, since the C-shaped permanent magnet segments are magnetically attracted to both the inner circumferential surface and the turned-back collar of the yoke member, it is made possible to fix the segments to the yoke member without use of an adhesive agent. Thus, it is possible to provide a magnetic circuit strong enough to endure vibration resulting from its fall etc at low cost.

On the other hand, according to the manufacturing method and apparatus of the present invention, since the plurally divided C-shaped permanent magnet segments can easily be incorporated into the yoke member, it is made possible to manufacture a high-performance and miniaturized magnetic circuit with high efficiency. Also, since not a cylindrical permanent magnet, but the C-shaped permanent magnet segments are incorporated, difficulty in producing a cylindrical permanent magnet, particularly a cylindrical rare earth sintered magnet, can be eliminated. Thus, it is possible to provide an inexpensive magnetic circuit with high productivity.

The above and other objects, characteristic features and advantages will become apparent to those skilled in the art from the description to be given herein below with reference to the accompanying drawings.

BRIEF DESCRIPTION OF THE DRAWINGS

FIG. 1(a) is a schematic perspective view showing one example of a magnetic circuit and an actuator having the magnetic circuit incorporated therein according to the present invention and FIG. 1(b) a schematic cross section thereof.

FIG. 7 illustrates modifications of the present invention, FIG. 7(a) being a schematic cross section illustrating the state in which the C-shaped permanent magnet segments have been inserted into a yoke member having a return part, FIG. 7(b) being a schematic cross section illustrating the state in which the C-shaped permanent magnet segments have been inserted onto the inner circumferential of a yoke member, and FIG. 7(c) being a schematic cross section illustrating the state in which the C-shaped permanent magnet segments have been inserted into a yoke member having concaves for accommodating an adhesive therein.

DETAILED DESCRIPTION OF THE PREFERRED EMBODIMENTS

Figure 2:
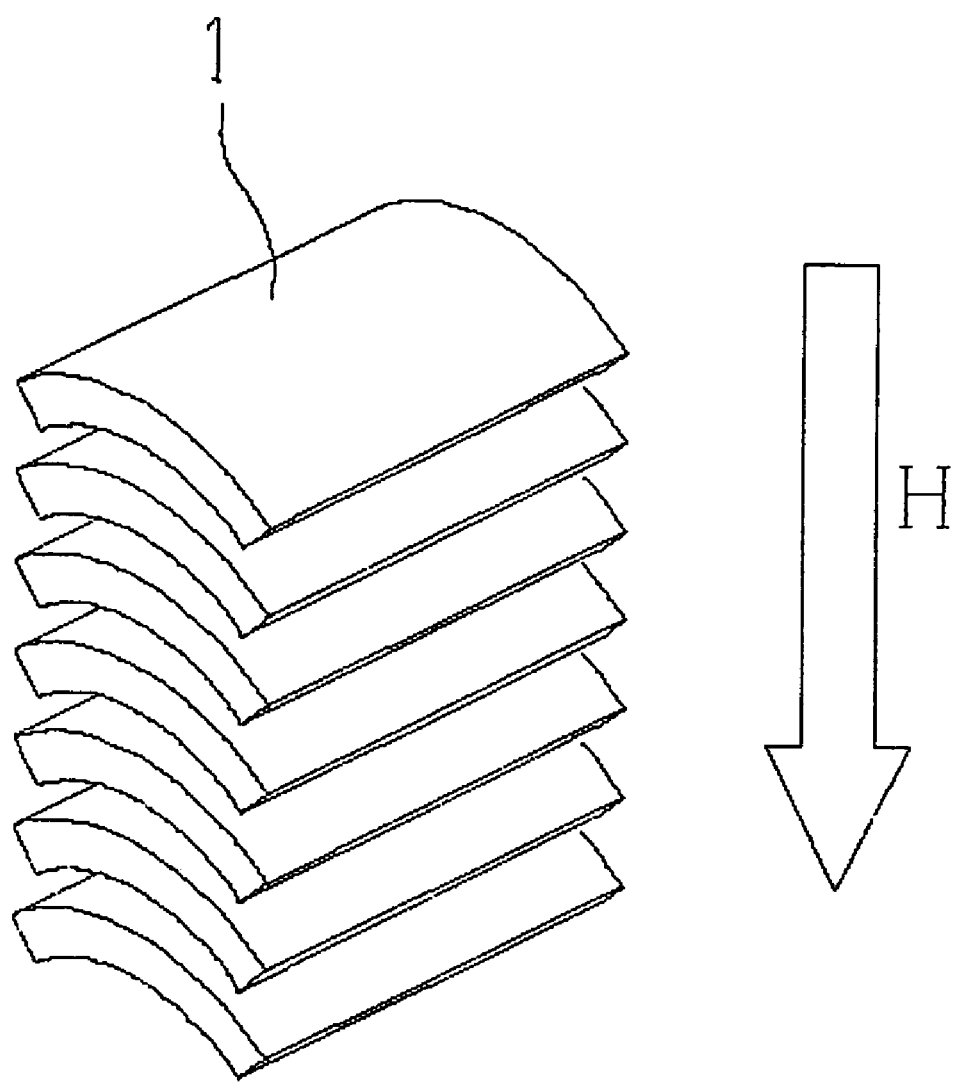
FIG. 2 is a schematic perspective view illustrating the manner in which C-shaped permanent magnet segments are being magnetized.

Embodiments of a magnetic circuit, its manufacturing method and apparatus, an actuator and a speaker each having the magnetic circuit incorporated therein according to the present invention will be described in detail with reference to the accompanying drawings.

First, as regards a permanent magnet incorporated into a yoke member of a magnetic circuit, not a cylindrical shape, but segments of a shape into which the cylindrical shape is divided, i.e. permanent magnet segments having a partially circular arc in cross section (C-shaped permanent magnet segments) are used in the present invention.

The direction of orientation of the C-shaped magnet segments may be either a direction parallel to the width direction (direction substantially orthogonal to the partially circular arc cross section) thereof or a direction of the thickness thereof. When it is intended to converge the magnetic flux so as to contribute to a coil disposed at the center portion of an actuator, for example, it is preferred to dispose the segments in the thickness direction. Incidentally, when the C-shaped permanent magnet segments oriented in the width direction, it is preferred to increase the number of division of the segments.

In order to conform to the miniaturization of an actuator, for example, the C-shaped permanent magnet segments can be formed into a small thickness of 2 mm or less. While it is difficult to form a-cylindrical magnet having a thickness of 2 mm or less from a cylindrical rare earth sintered magnet, when a rare earth sintered magnet is formed into C-shaped permanent magnet segments, even those having a thickness of 2 mm or less are relatively easy to produce. Furthermore, a processing machine may be used to fabricate C-shaped permanent magnet segments from a rectangular parallelepiped block.

Though the material for the C-shaped permanent magnet segments is optional insofar as it functions as a permanent magnet, in view of the application thereof to an actuator or a speaker high in performance, a rare earth sintered magnet proves to be advantageous. The rare earth sintered magnet is composed preponderantly of a rare earth element, a transition metal element and boron. The magnet composition may optionally be selected depending on the performance required. When an R-T-B-based rare earth sintered magnet (wherein R stands for at least one of rare earth elements, T for at least one of transition metal elements containing as an indispensable element or elements Fe or Fe and Co, and B for boron) is adopted, for example, for the purpose of obtaining a rare earth sintered magnet excellent in magnetic characteristics, the composition thereof after being sintered is preferably composed of 20 to 40 mass % of rare earth elements R, 0.5 to 4.5 mass % of boron B and the balance of transition metal elements T. Here, R stands for at least one rare earth element selected from the group consisting of Y, La, Ce, Pr, Nd, Sm, Eu, Gd, Tb, Dy, Ho, Er, Yb and Lu. Among other rare earth elements enumerated above, Nd is preferably used as a principal component because it is resourceful and relatively inexpensive. In addition, inclusion of Dy is effective because it increases an anisotropic magnetic field to enhance the coercive force Hcj. Furthermore, it is made possible to add an additive element M to form a R-T-B-M-based rare earth sintered magnet. The additive element M raised herein is at least one member selected from the group consisting of Al, Cr, Mn, Mg, Si, Cu, C, Nb, Sn, W, V, Zr, Ti, Mo, Bi, Ga.

The C-shaped permanent magnet segments are fabricated from a rare earth sintered magnet by compression molding in a magnetic field raw material alloy powder, such as Nd—Fe—B-based magnetic powder, for example, into a C-shape. The compression molding is performed, with an orientation magnetic field applied to the direction of the thickness, for example, of a compacted body to be molded. It is made possible to realize a substantially radial orientation utilizing a special metal mold. The compacted body obtained is subjected to heat treatment (sintering and aging treatment) to fabricate C-shaped permanent magnet segments (rare earth sintered magnets). Even in the fabrication of the C-shaped permanent magnet segments from rare earth sintered magnets, occurrence of deformation thereof and cracks and chips therein is slight during the process of sintering.

The C-shaped permanent magnet segment may have a shape corresponding to that obtained by dividing a cylindrical magnet into an optional number. When the curvature of the outer circumference (partially circular arc) of the segment is set to be substantially 90°, for example, four segments are combined to obtain a substantially cylindrical shape.

FIG. 1(a) and FIG. 1(b) illustrate one example of a magnetic circuit having four permanent magnet segments 1 incorporated in a cylindrical yoke member 4 and an actuator using the magnetic circuit. The incorporation of the four permanent magnet segments 1 configures a substantially cylindrical permanent magnet. The inner circumferential surfaces 4a of the four permanent magnet segments 1 are magnetized to have the same polarity and, when the substantially cylindrical permanent magnet is configured, all the inner circumferential surfaces have the same polarity (N pole, for example) and all the outer circumferential surfaces have the opposite polarity (S pole, for example). When a transducer 6 equipped with a drive coil 5 is disposed inside the permanent magnet segments 1 of the magnetic circuit combined in a cylindrical form to vibrate the transducer 6 vertically in FIG. 1(b) by means of the cooperation of the permanent magnet segments 1 with the drive coil to configure an actuator. In this actuator, a control device (not shown) controls the electric current flowing through the drive coil 5 and controls the actuation of the actuator.

The cylindrical yoke member 4 is provided at one end thereof with a collar 4b, as shown in FIG. 1(b), which is turned back substantially at right angles and on which the bottoms of the permanent magnet segments 1 are supported. Therefore, the permanent magnet segments 1 are magnetically attracted to both the inner circumferential surface 4a and the collar 4b of the yoke member 4.

In the magnetic circuit of the present invention, it is important that the permanent magnet segments 1 be magnetically attracted to both the inner circumferential surface 4a and the collar 4b of the yoke member 4, as described above, thereby enabling firm fixation thereof without use of an adhesive agent. With respect to the case where the permanent magnet segments 1 were magnetically attracted to both the inner circumferential surface 4a and the collar 4b of the yoke member 4 (Example) and the case where they were magnetically attracted only to the inner circumferential surface 4a of the yoke member 4 provided with no collar 4b (Comparative Example), drop tests were actually conducted to examine the states of fixation of the permanent magnet segments 1. The results thereof are shown in Table 1 below. Incidentally, ten samples of actuators were tested for the movement of the permanent magnet segments 1 through the visual observation when the samples were allowed to fall from each of the heights of 30 cm, 100 cm and 150 cm.

TABLE 1

| | Height | | |
|---|---|---|---|
| | 30 cm | 100 cm | 150 cm |
| Example | 0/10 | 1/10 | 3/10 |
| Comparative Example | 8/10 | 10/10 | 10/10 |

It was clear from Table 1 above that the number of the permanent magnet segments moved in each of the ten samples according to the case where the permanent magnet segments 1 were magnetically attracted to both the inner circumferential surface 4a and the collar 4b of the yoke member 4 (Example) was a few at most, whereas almost all of the permanent magnet segments in each of the ten specimens according to the case where the permanent magnet segments 1 were magnetically attracted only to the inner circumferential surface 4a of the yoke member 4 (Comparative Example) was moved.

As described above, in the magnetic circuit of the present invention, the intensity of fixation between the yoke member 4 and the permanent magnet segments 1 can sufficiently be obtained only by means of the magnetic intensity between them to enable the enhancement of the productivity and the low-cost fabrication. In spite of not requiring use of an adhesive agent, the present invention can provide a magnetic circuit sufficiently endurable to vibration resulting from the drop etc. thereof and not problematic in terms of reliability.

When a magnetic circuit is configured through the incorporation of plural permanent magnet segments 1, as described above, preferably attention is paid to the intervals between the adjacent permanent magnet segments 1. Specifically, the interval is preferably in the range of 0.005 to 0.5 mm, more preferably in the range of 0.1 to 0.3 mm. This interval enables the permanent magnet segments 1 to be incorporated without any collision against each other, prevents the magnetic intensity thereof from being lowered to a great extent as compared even with a ring magnet (radially oriented magnet etc.) and enables the dropping impact to be absorbed. Since the permanent magnet segments 1 are magnetically attracted to the yoke member 4 by means of the magnetic intensity, the magnetic intensity is converted in the presence of a high impact into a frictional force. Therefore, the segments can move by the amount of the interval to generate pseudo impact absorption. This is why the dropping impact can be absorbed.

The magnetic circuit of the above configuration is fabricated by the following procedure. First, the C-shaped permanent magnet segments 1 fabricated are magnetized. As shown in FIG. 2, for example, the plural C-shaped permanent magnet segments 1 are overlapped and subjected to magnetization treatment in a lump. To realize high performance, the magnetization treatment is performed in the direction of the thickness of the segments. To magnetize the overlapped C-shaped permanent magnet segments 1 in the thickness direction, the direction of the magnetization magnetic field H may be set to be a vertical direction in FIG. 2.

While the magnetized C-shaped permanent magnet segments 1 are incorporated into the yoke member to fabricate a magnetic circuit, when the C-shaped permanent magnet segments are adopted, as described above, it is required that plural C-shaped permanent magnet segments be combined into a cylindrical shape. In this case, one-by-one incorporation of the C-shaped permanent magnet segments 1 is inconvenient in workability and makes it difficult to efficiently manufacture magnetic circuits.

Figure 3:
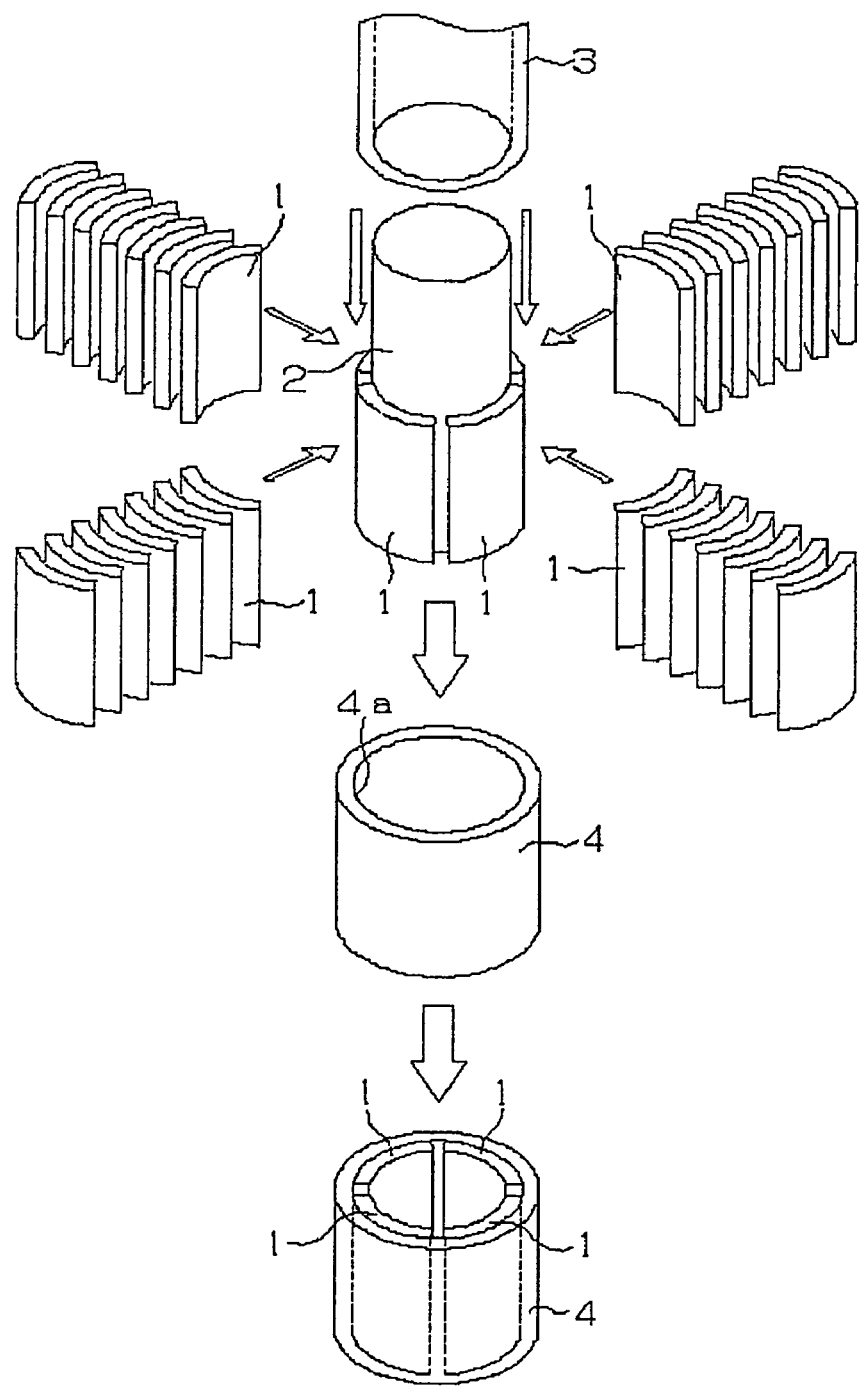
FIG. 3 is a schematic perspective view illustrating the scheme of the manufacturing apparatus and method according to the present invention.

In view of the above, the present invention uses a manufacturing apparatus shown in FIG. 3, for example, to incorporate a required number of C-shaped permanent magnet segments 1 into a yoke member in a lump.

The manufacturing apparatus shown in FIG. 3 comprises a center rod 2 that permits the C-shaped permanent magnet segments 1 to be magnetically, attracted to the peripheral surface thereof and a nonmagnetic supporter 3 that is disposed outside the center rod. Since the center rod 2 is required to have the C-shaped permanent magnet segments 1 attracted magnetically thereto, it has to be formed of a magnetic material. The diameter of the center rod has to be determined so that the curvature of the outer circumferential surface may conform substantially to that of the inner circumferential surface of the C-shaped permanent magnet segments 1.

On the other hand, the nonmagnetic supporter 3 assumes a ring (cylindrical) shape and is disposed on the outer circumferential surface of the center rod 2 in a manner coaxial with the center rod 2. That is to say, the nonmagnetic supporter 3 is disposed so that it may cover the outer periphery of the center rod 2 inserted into an opening of the supporter. The center rod 2 and the nonmagnetic supporter 3 are movable relative to each other. Therefore, the center rod 2 is detachably inserted into the nonmagnetic supporter 3. The nonmagnetic supporter 3 is abutted on the end faces of the C-shaped permanent magnet segments 1 and, during the extraction of the center rod 2 that will be described later, fulfills a role of regulating the positions of the segments. Therefore, it is formed of a nonmagnetic material so as not to permit the segments 1 to be magnetically attracted thereto. Incidentally, when magnet segments having very high magnetic intensity are used as the permanent magnet segments 1, since the magnetic attraction thereof to the center rod 2 is high, a large force is required to extract the center rod 2. In this case, the center rod 2 may be provided on the surface thereof with a separate nonmagnetic material to isolate the magnetic material constituting the center rod and the permanent magnet segments 1 from each other via the nonmagnetic material, thereby adjusting the magnetic attraction between them.

While the manufacturing apparatus fundamentally has a very simple structure equipped with the center rod 2 and the nonmagnetic supporter 3, it enables plural C-shaped permanent magnet segments 1 to be fixed onto the inner circumferential surface 4a of a cylindrical yoke member 4 in a lump. The operation of inserting the magnet using the manufacturing apparatus will be described below with reference to FIG. 4.

Figure 4:
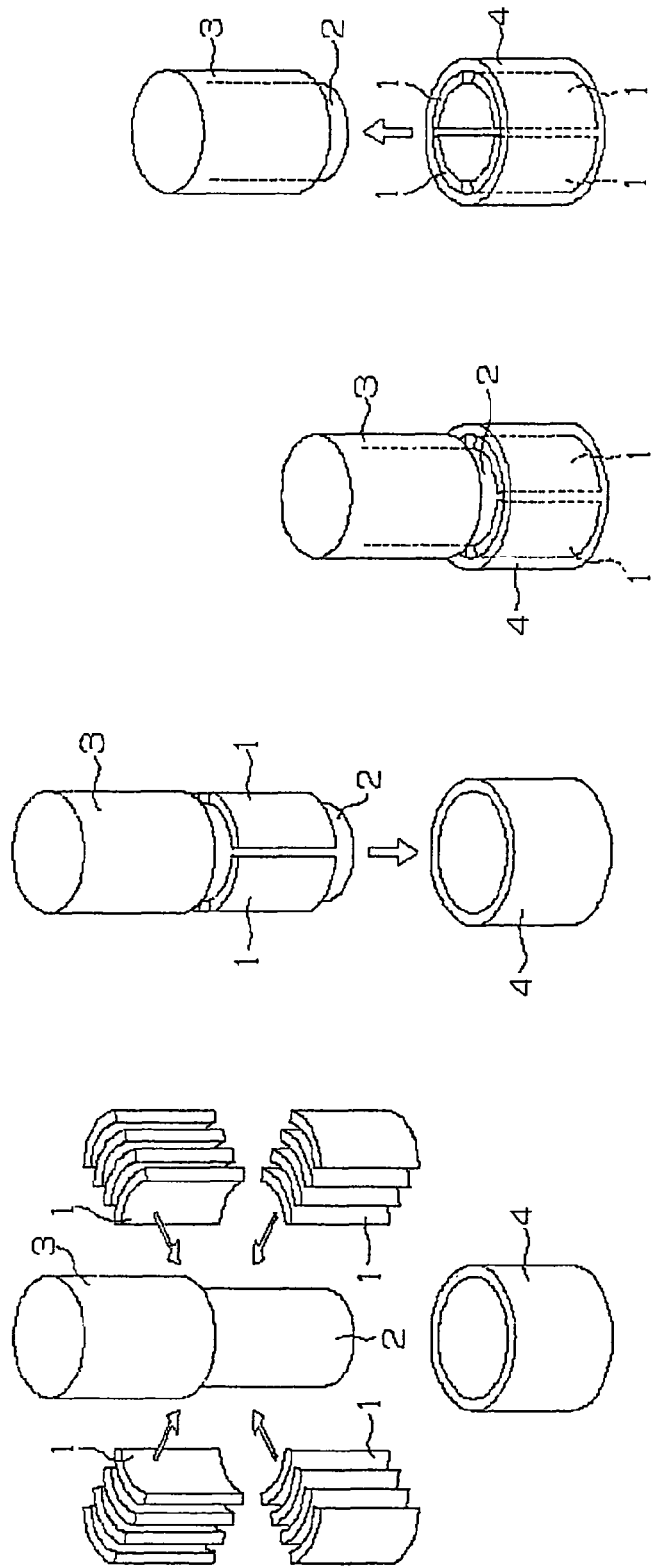
FIG. 4 illustrates a process of inserting the C-shaped permanent magnet segments into a yoke member according to the manufacturing apparatus and method of the present invention, FIG. 4(a) being a schematic perspective view illustrating the state in which the C-shaped permanent magnet segments are being supplied onto a central rod, FIG. 4(b) being a schematic perspective view illustrating the state in which the C-shaped permanent magnet segments have been attracted onto the central rod, FIG. 4(c) being a schematic perspective view illustrating the state in which the central rod has been inserted into the yoke member, and FIG. 4(d) being a schematic perspective view illustrating the state in which the central rod has been extracted from the yoke member and in which the C-shaped permanent magnet segments have been set in position within the yoke member.

The C-shaped permanent magnet segments 1 are inserted into and fixed to the yoke member 4 according to the following procedure. First, the C-shaped permanent magnet segments 1 are magnetically attracted to the circumferential surface of the center rod 2 as shown in FIG. 4(*a*). In the case of combining four C-shaped permanent magnet segments 1, the curvature of the partial circular arc of which is substantially 90°, for example, into a substantially cylindrical form, the C-shaped permanent magnet segments 1 are supplied onto the circumferential surface of the center rod 2 from four directions, respectively, and magnetically attracted to the center rod 2 by means of the magnetic intensity of the segments 1. In this case, the overlapped C-shaped permanent magnet segments 1 set in a magazine etc., for example, may be extruded to supply them one by one onto the circumferential surface of the center rod 2.

FIG. 4(*b*) shows the state in which four C-shaped permanent magnet segments 1 have been attracted magnetically to the circumferential surface of the center rod 2. When the C-shaped permanent magnet segments 1 oriented in their respective thickness direction have been magnetized, for example, the inner circumferential surfaces of all the C-shaped permanent magnet segments 1 have the same polarity. Though the same poles are opposed to each other when the segments have been combined into a cylindrical shape, the magnetic attraction of the segments to the peripheral surface of the center rod formed of a magnetic material prevents the opposed segments 1 from inducing magnetic repulsion. The description given here is made with reference to the example in which the C-shaped permanent magnet segments 1 of a circular arc in cross section are incorporated using the columnar center rod 2. This is not limitative. For example, polygonal permanent magnet segments 1 may be incorporated into the yoke member 4 using a polygonal center rod 2.

After the four C-shaped permanent magnet segments 1 are magnetically attracted to the peripheral surface of the center rod 2, as shown in FIG. 4(*c*), the center rod 2 is inserted into the cylindrical yoke member 4 to oppose the C-shaped permanent magnet segments 1 to the inner circumferential surface 4a of the yoke member 4. The nonmagnetic supporter 3 is then used to regulate the positions of the C-shaped permanent magnet segments 1 so as not move the segments upward and, in this state, the center rod 2 is extracted as shown in FIG. 4(*d*) to attract magnetically and fix to the inner circumferential surface of the yoke member 4 the segments that have been magnetically attracted to the peripheral surface of the center rod 2.

Figure 5:
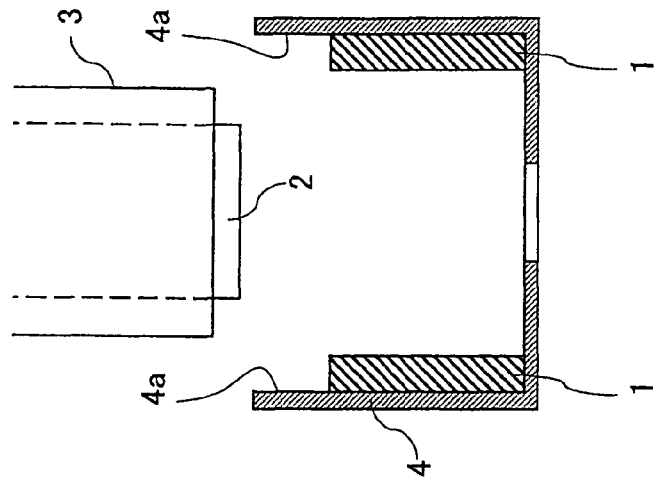
FIG. 5 illustrates in detail an operation of setting the C-shaped permanent magnet segments in position within the yoke member, FIG. 5(a) being a schematic cross section illustrating the state in which the C-shaped permanent magnet segments face the inner circumferential surface of the yoke member, FIG. 5(b) being a schematic cross section illustrating an operation of extracting the central rod, and FIG. 5(c) being a schematic cross section illustrating the state in which the C-shaped permanent magnet segments have been attracted to the yoke member.

FIG. 5 illustrates in detail the operations shown in FIG. 4(*c*) and FIG. 4(*d*). FIG. 5(*a*) shows the state in which the center rod 2 has been inserted into the cylindrical yoke member 4. In this state, the C-shaped permanent magnet segments 1 are opposed to the inner circumferential surface of the yoke member 4 to exert the magnetic attraction also between the segments 1 and the yoke member 4. At this time, however, since the magnetic attraction exerted between the segments 1 and the center rod 2 is larger, the segments 1 are kept attracted magnetically to the peripheral surface of the center rod 2.

Then, as shown in FIG. 5(*b*), the nonmagnetic supporter 3 is used to position-regulate the segments 1 so as not move the segments upward and, in this state, the center rod 2 is elevated. Since the center rod 2 is insertable into and detachable from the nonmagnetic supporter 3, it is possible to upwardly move and extract the center rod 2, with the nonmagnetic supporter 3 fixed. At this time, the nonmagnetic supporter 3 is abutted on the end faces of the segments 1 to prevent the segments 1 from their elevation accompanied by the elevation of the center rod 2.

When the center rod 2 has been extracted as described above, it assumes the state in which it has been extracted from among the segments 1 combined into a cylindrical shape to sharply reduce the magnetic attraction exerted between the segments 1 and the center rod 2. When the center rod 2 has completely been extracted from among the segments 1, there gives rise to a state in which the magnetic attraction exerted between the center rod 2 and the segments has been eliminated. As a result, the segments 1 are attracted to the inner circumferential surface 4a of the yoke member 4 by means of the magnetic attraction exerted between the segments 1 and the yoke member 4. As shown in FIG. 5(*c*), the segments are magnetically attracted and fixed to the inner circumferential surface 4a of the yoke member 4. To make the state of fixation of the segments 1 to the circumferential surface 4a more stable, fixation by means of an adhesive agent may also be added.

Incidentally, when four C-shaped permanent magnet segments 1 are to be inserted into and fixed to the yoke member 4, the interval of the adjacent segments 1 disposed on the inner circumferential surface 4a of the yoke member 4 is preferably in the range of around 0.1 to 0.5 mm. When the interval is unduly small, there will be a possibility of the four segments being inserted into the yoke member at a time only with difficulty from the standpoint of the dimensional accuracy of the segments 1. Inversely, when the interval is unduly large, the magnetic characteristic (a magnetic flux contributing to a coil) will be reduced to possibly lower the impellent of an actuator, for example. In order for the segments 1 to be attracted also to the collar 4b of the yoke member 4, the segments 1 are preferably disposed on the side where the collar 4a is formed. By doing so, the firm fixation described above can be materialized.

As described in the foregoing, since the C-shaped permanent magnet segments 1 are inserted into and fixed to the yoke member 4 using the center rod 2 equipped with the nonmagnetic supporter 3, the cumbersome insertion of the magnet into the yoke member can continuously be performed for a short period of time. The operation at this time is ready to make, thereby enabling actuators to be manufactured with high productivity. When adopting a structure having the center rod 2 or nonmagnetic supporter 3 biased by means of by biasing force of a coil spring etc. and a same mechanism as a knock-type ballpoint pen etc. disposed, a one-push operation enables the insertion of a magnet. Furthermore, since the C-shaped permanent magnet segments 1 are magnetized in advance in a lump, it is unnecessary for the segments 1 to be magnetized after the incorporation thereof into the yoke member 4. This also enables the productivity to be improved.

Figure 6:
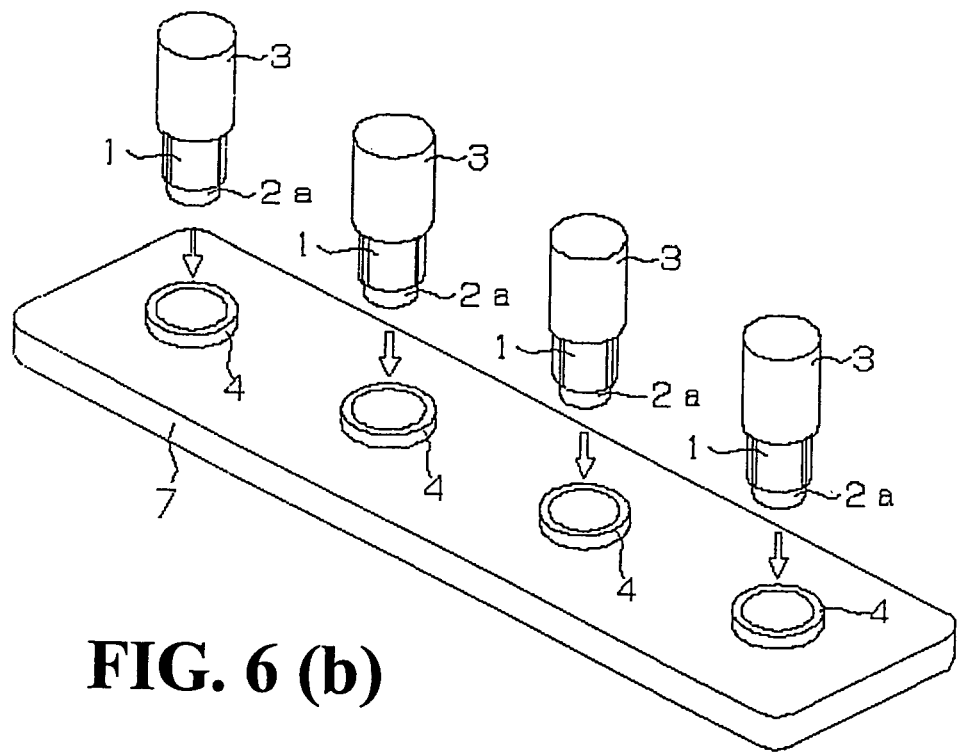
FIG. 6 illustrates one example of the manufacturing apparatus according to the present invention provided with four sets of central rods each equipped with a nonmagnetic supporter, FIG. 6(a) being a schematic perspective view illustrating the state in which the C-shaped permanent magnet segments have been set in position onto each central rod and FIG. 6(b) being a schematic perspective view illustrating the state in which the C-shaped permanent magnet segments have been set in position within each yoke member.
Figure 6:
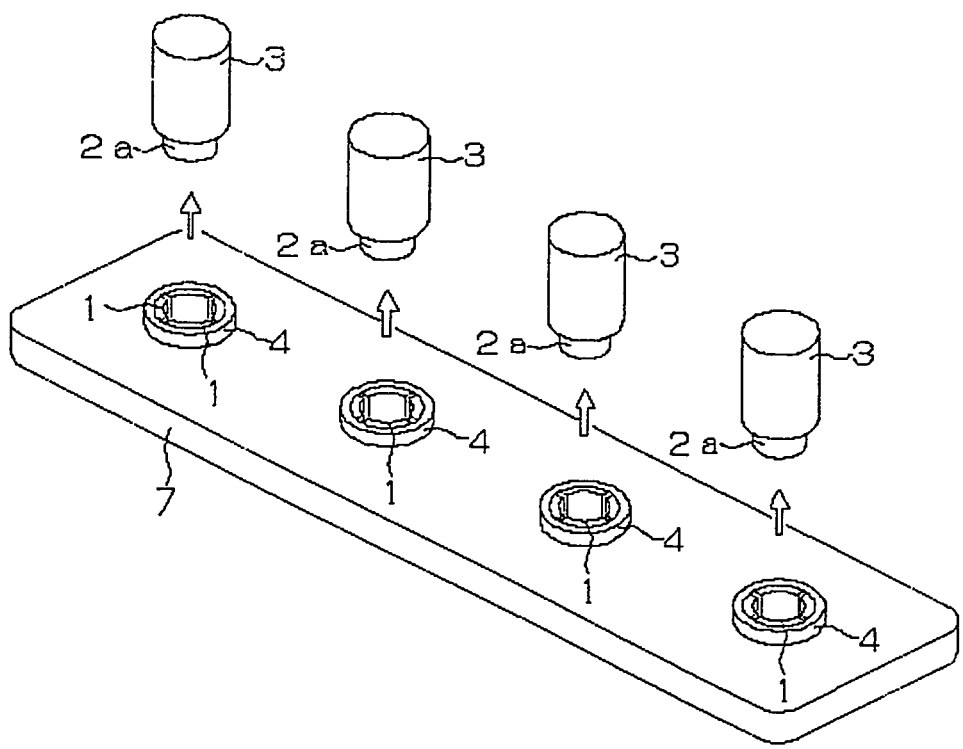

In the manufacturing apparatus, when adopting a structure in which plural center rods 2 each having a nonmagnetic supporter 3 are arrayed and magnet insertion into plural yoke members 4 is carried out at the same time, a high efficiency can be attained. FIG. 6 shows one example of the manufacturing apparatus of a configuration having four center rods 2 each having a nonmagnetic supporter 3, disposed and the magnet insertion into four yoke members 4 is carried out at the same time. The yoke members 4 are set in position in a carrier pallet 7 having circular concave portions formed in conformity with the shape of the yoke members, and the magnet insertion is performed in the aforementioned operation. FIG. 6(*a*) shows the state in which the C-shaped permanent magnet segments 1 have been attached to the center rod 2 and FIG. 6(*b*) the state in which the segments 1 have been attached to the yoke members 4.

Incidentally, in this example, the center rod 2 has a leading end 2a serving as a guide for guiding the center rod 2 into the yoke member 4 and thus it is possible to accurately position the center rod 2 relative to the yoke member 4. When it is intended to perform magnet insertion relative to the plural yoke members 4 at the same time, the positional accuracy of each center rod 2 relative to each yoke member 4 is required. The utilization of the leading end 2a as a guide enables accurate magnet insertion into the yoke members 4.

In the configuration of the manufacturing apparatus as shown in FIG. 6, the magnet insertion relative to the four yoke members 4 can be performed in a lump and, at the same time, the magnet segments can be supplied in turn to the yoke members 4 set in position in the carrier pallet 7. Thus, the treatment can continuously be made to enhance the efficiency to a great extent.

Use of the manufacturing method and manufacturing apparatus according to the present invention enables incorporation of plurally divided C-shaped permanent magnet segments 1 into the yoke member 4 with ease and enables manufacture of high-performance miniaturized magnetic circuits with high efficiency. Furthermore, since not a cylindrical permanent magnet, but the C-shaped permanent magnet segments 1 are incorporated, it is possible to eliminate the difficulty in manufacturing a cylindrical permanent magnet, particularly a cylindrical rare earth sintered magnet and manufacture magnetic circuits with high productivity at low cost.

The magnetic circuit, manufacturing method and manufacturing apparatus according to the present invention are not limited to the examples described above. In accordance with the shape etc. of the yoke member 4, for example, various changes can be made. Modifications of the magnetic circuit, manufacturing method and manufacturing apparatus according to the present invention will be described hereinafter.

FIG. 7(*a*) shows a case where the yoke member 4 having the turned-back collar 4b formed on the inside diameter part thereof is provided with a turnup part 4c turned up further at right angles. When it is intended to attach and fix the C-shaped permanent magnet segments 1 to the yoke member 4 of this shape, generally it is very difficult to do so because the turnup part 4c constitutes an obstacle to the insertion of the segments.

In such cases as this, utilization of the manufacturing apparatus according to the present invention enables magnet insertion readily and infallibly, provided that the center rod 2 has to be formed into a hollow pipe to permit the insertion of the turnup part 4c into the hollow part thereof. This shape of the center rod 2 enables simultaneous positioning of the center rod 2 relative to the yoke member 4 and accurate magnet insertion. With the same apparatus configuration and same operation method as in the embodiment shown in FIG. 3 to FIG. 5, except for the formation of the center rod 2 into the hollow pipe, it is made possible to attach the C-shaped permanent magnet segments 2 to the yoke member 4.

FIG. 7(*b*) shows an example in which the C-shaped permanent magnet segments 1 are attached to an outer circumferential surface 4d of the yoke member 4. In this case, the center rod 2 and the nonmagnetic supporter 3 are formed into a cylindrical form, and the nonmagnetic supporter 3 is disposed on the inner circumferential surface of the center rod 2. In addition, in the magnet insertion, the C-shaped permanent magnet segments 1 are magnetically attracted to the inner circumferential surface of the center rod 2. This can be achieved performing the operation similar to that utilizing the center rod and nonmagnetic supporter shown in FIG. 3 or FIG. 4 and setting the segments 1 in position on the inner circumferential surface of the cylindrical yoke member. The other operating method is the same as that shown in FIG. 3 to FIG. 5.

FIG. 7(*c*) shows a modification on the shape of the yoke member 4. The structures of the center rod 2 and nonmagnetic supporter 3 and the operation method of the magnet insertion are the same as those of the embodiment shown in FIG. 3 to FIG. 5. In the present modification, the yoke member 4 is provided at the outer peripheral bottom with a concave part 4*e* in which an adhesive agent is to be filled. This structure enables the C-shaped permanent magnet segments 1 to be magnetically attracted and fixed to the inner circumferential surface of the yoke member 4 and also fixed simultaneously by means of the adhesive agent filled in the concave part 4*e*.

The structure of the yoke member of this embodiment bending-processed from magnetic metal plate, such as of iron, is advantageous in terms of the enhancement of the accuracy of the attachment positions of the C-shaped permanent magnet segments 1. When a magnetic metal plate is bending-processed, the corner portion thereof is inevitably formed into a slight R-shape and, when the C-shaped permanent magnet segments 1 are to be attached and fixed thereto, these have to be disposed slightly upward from the bottom thereof. The formation of the concave part 4*e* enables the R-shaped portion to be set back and the C-shaped permanent magnet segments 1 to be infallibly in contact with the inner circumferential surface 4*a* and the collar 4*b* of the yoke member 4 simultaneously. Thus, the C-shaped permanent magnet segments 1 can magnetically be fixed firmly to the yoke member 4. While the concave part 4*e* is formed on the bottom in FIG. 7(*c*), it may be formed on the side of the circumferential surface of the yoke member.

In the manufacturing method and apparatus of the present invention, the method of supplying the C-shaped permanent magnet segments 1 to the center rod 2 can be modified. While the present embodiment intends to disposed magazines in the four direction of the center rod 2 and supply four C-shaped permanent magnet segments 1 from the magazines to the peripheral surface of the center rod 2, since the segments are magnetically attracted to the center rod 2 with great force by the magnetic attraction, there is a possibility of a disadvantage being incurred, such as a damage inflicted on the segments due to their respective collision. In addition, in many cases, the segments 1 are stored as accommodated in individual cavities for the purpose of preventing damage and contamination thereof, the procedure of resetting the stored segments in position in the magazines is made cumbersome and complicated.

Figure 8:
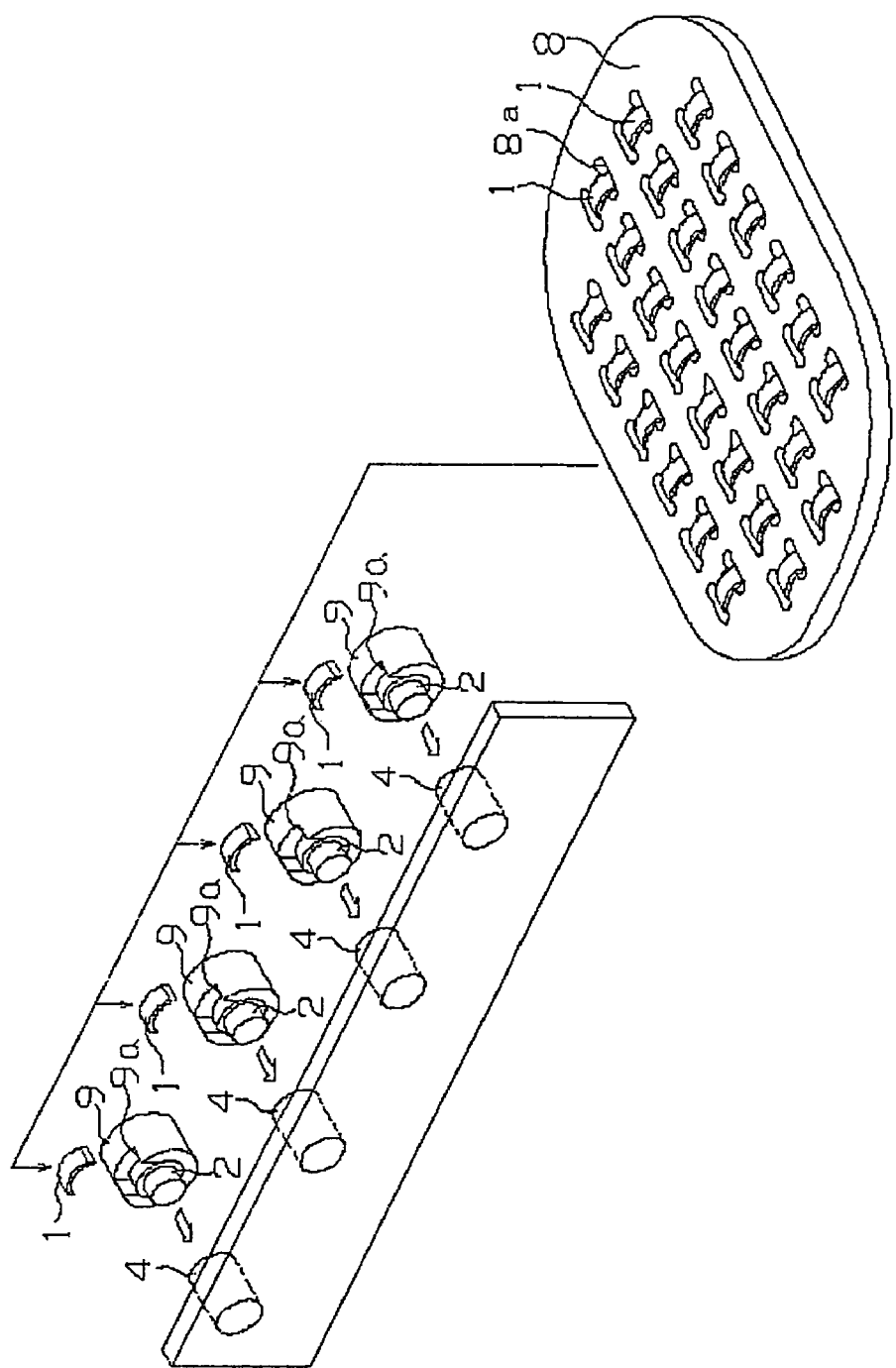
FIG. 8 is a schematic perspective view illustrating an example of the apparatus for setting the C-shaped magnet segments stored in a magnetizing jig in position onto each central rod.

To eliminate these disadvantages, the configuration shown in FIG. 8, for example, may be adopted, in which a magnet-setting alignment guide 9 is attached to each of center rods 2, and C-shaped permanent magnet segments 1 are inserted into openings 9*a* of the guides 9 and set in position one by one on the circumferential surfaces of the center rods 2.

The setting process will be described in detail. First, the magnet-setting alignment guide 9 is attached to each of the center rods 2. In this case, the direction in which the center rod 2 is installed is made horizontal unlike the vertical direction in the preceding embodiment, and the yoke members 4 that are set in position in the pallet 7 are directed horizontally.

The C-shaped permanent magnet segments 1 are accommodated in a magnetizing jig 8 having individual cavities 8*a* formed as predetermined concaves, taken out one by one and set in position on the circumferential surface of the center rod 2. The segments 1 can easily be taken out from the individual cavities 8*a* using a pickup jig (not shown) having a metal chip attached to the leading end thereof. The segment 1 taken out with the pickup jig is magnetically attracted to the peripheral surface of the center rod 2, with the segment position-aligned utilizing the opening 9*a* of the magnet-setting alignment guide 9.

Figure 9:
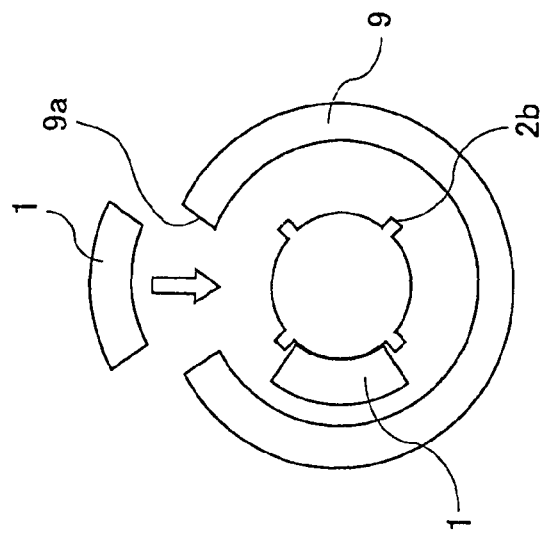
FIG. 9 illustrates the procedure of setting the C-shaped magnet segments in position in the apparatus shown in FIG. 8, FIG. 9(a) being a schematic front view illustrating an operation of setting a first set of C-shaped magnet segments in position, FIG. 9(b) being a schematic front view illustrating an rotation operation of the central rod, and FIG. 9(c) being a schematic front view illustrating an operation of setting a second set of C-shaped magnet segments in position.
Figure 9:
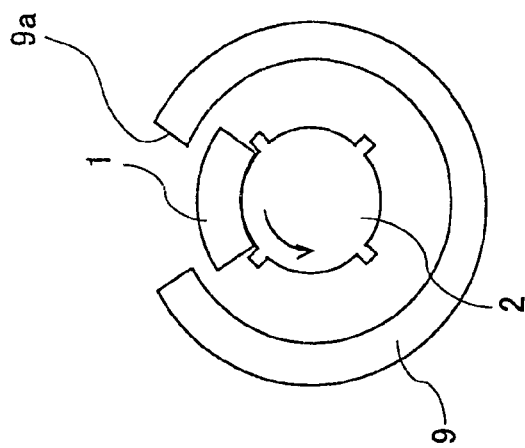
Figure 9:
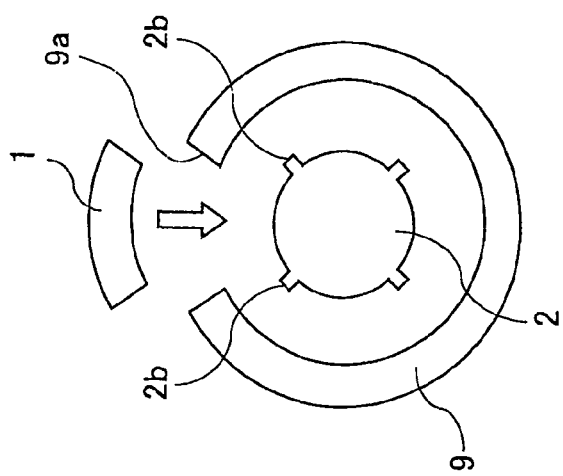

FIG. 9 shows a procedure of successively attaching the C-shaped permanent magnet segments 1. To attach a C-shaped permanent magnet segment 1 to the peripheral surface of the center rod 2, as shown in FIG. 9(*a*), a first segment 1 is magnetically attracted and fixed to the peripheral surface of the center rod 2 at a predetermined position utilizing the opening 9*a* of the magnet-setting alignment guide 9. At this time, when four projections 2*b* are provided on the peripheral surface of the center rod 2 as boundaries of the segments 1, the segments can be attached to the peripheral surface in a more accurately positioned state.

After the first segment 1 is attached to the center rod 2, the rod is rotated counterclockwise to move the first segment 1 as shown in FIG. 9(*c*). When four segments 1 are to be combined, the angle of rotation is approximately 90°. The direction of rotation may either be counterclockwise or clockwise.

Then, as shown in FIG. 9(*c*), a second segment 1 is magnetically attracted and fixed to the peripheral surface of the center rod at a predetermined position utilizing the opening 9*a* of the magnet-setting alignment guide 9. By repeating this procedure four times, the attachment of the four segments 1 to the center rod is completed. The magnet insertion into the yoke 4 is the same as in the preceding embodiment, provided that the direction of the insertion and extraction is horizontal.

According to the present embodiment, it is unnecessary to set the C-shaped permanent magnet segments 1 in position from the magnetizing jig 8 into magazines and possible to supply the segments 1 from the magnetizing jig 8 directly onto the center rod 2. Since the segments 1 are attached to the center rod one by one, it is possible to avoid any damage on the segments due to their collision.

The magnetic circuit, its manufacturing method and apparatus and actuator having the magnetic circuit incorporated therein according to the present invention have been described in the foregoing. The magnetic circuit can be used for a speaker as well besides the actuator.

Figure 10:
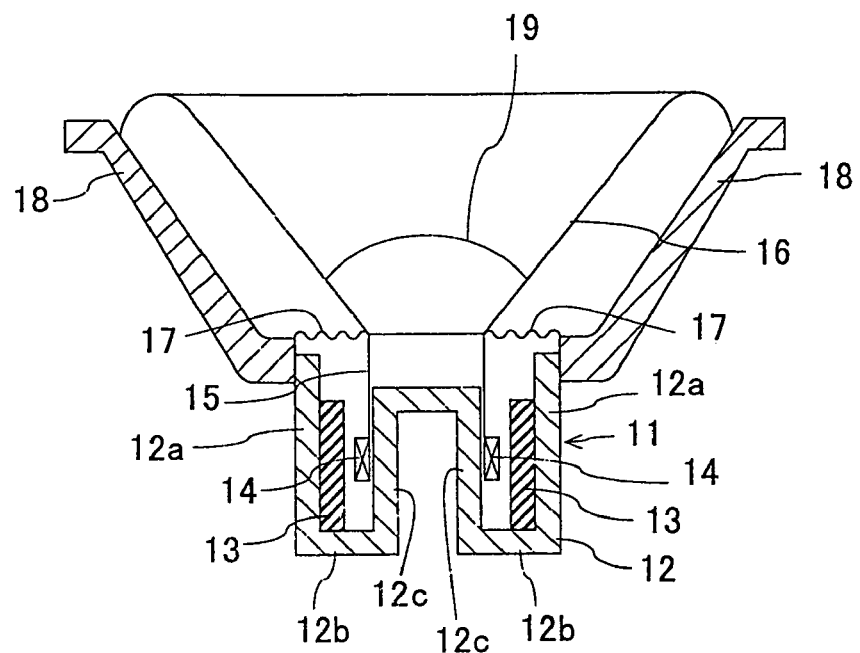
FIG. 10 is a schematic cross section showing one example of a speaker having the magnetic circuit of the present invention incorporated therein.

FIG. 10 illustrates an example of a speaker using the magnetic circuit of the present invention. A magnetic circuit portion 11 fundamentally has the same configuration as the magnetic circuit described above, in which plural permanent magnet segments 13 are magnetically attracted to the inner wall of a cylindrical yoke member 12. Here, the segments 13 are magnetized so that the inner circumferential surfaces thereof have the same polarity. When the segments 13 are combined, they are magnetically attracted to the inner wall of the yoke member 12, with their opposed surfaces exhibiting the same polarity. The cylindrical yoke member 12 comprises an outer cylinder portion 12*a*, a bottom portion 12*b* turned back at right angles at the bottom of the outer cylinder portion 12*a* and an inner cylinder portion 12*c* turned up at right angles from the bottom portion 12*b*. The inner cylinder portion 12*c* faces the segments 13, leaving a predetermined space between them as a magnetic gap.

In the speaker of this embodiment, a voice coil bobbin 15 having a voice coil 14 wound around it is inserted into the magnetic gap to induce vibration of the speaker in the vertical direction in FIG. 10 through the cooperation of the voice coil 14 and the magnetic circuit portion 11 (permanent magnet segments 13).

A diaphragm 16 is joined to the voice coil bobbin 15 and vibrated with the operation of the voice coil bobbin 15. The voice coil bobbin 15 is joined to the center of the diaphragm 16 and also joined via a damper 17 to a frame 18.

The diaphragm 16 in this embodiment is a cone-shaped one and has its outer circumferential edge joined to the frame 18. The center portion of the diaphragm 16 is provided with a dust cap 19 for preventing dust from entering the magnetic circuit portion 11 and voice coil bobbin 15. Incidentally, the diaphragm 16 is not limited to the cone-shaped one, but any diaphragm of an optional shape may be adopted. A concrete example thereof is a tabular diaphragm having a honeycomb structure. The material for the diaphragm 16 is optional and includes cone paper, plastic, carbon fiber and their combinations, and any of the conventional diaphragm materials is available.

In the speaker of the present embodiment, the voice coil bobbin 15 is disposed so as to face the permanent magnet segments 13 disposed into a cylindrical shape. When adopting this type of magnetic circuit, use of ferrite magnets as the segments 13 is insufficient because the ferrite magnets have a small magnetic intensity to possibly fail to obtain a desirable vibration stroke. Therefore, when adopting the magnetic circuit for the speaker, rare earth sintered magnets are preferably used as the permanent magnet segments 13.

Figure 11:
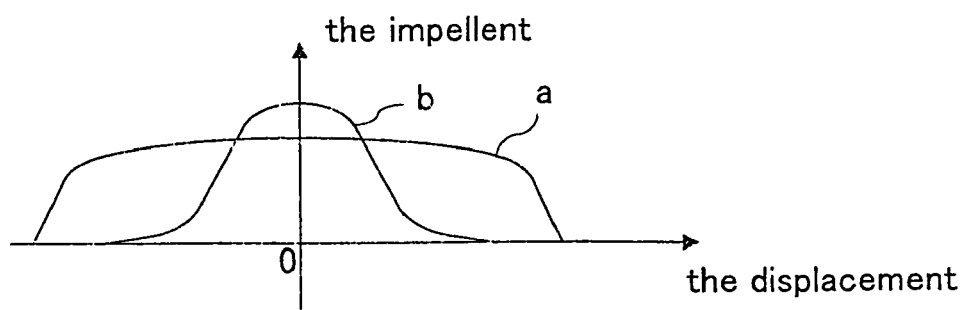
FIG. 11 is a characteristic diagram showing the relationship between the impellent and the displacement in the magnetic circuits according to the present invention and prior art.

FIG. 11 shows a difference in impellent between voice coil bobbins when using different magnetic circuits. When the permanent magnet segments 13 are disposed into a cylindrical shape, has their inner circumferential surfaces facing the voice coil 14 as in the present embodiment and are further formed of rare earth magnets (NdFeB-based magnets), it is possible to obtain stable impellent in a wide range of displacement as shown by line "a" in FIG. 11. On the other hand, when using an ordinary magnetic circuit having a ring-shaped ferrite magnet, while higher impellent can be obtained in case where the displacement is small, the impellent is rapidly lowered in case where the displacement becomes large. A speaker is required to have a large vibration stroke to attain a high phonetic quality. Adoption of the magnetic circuit of the present invention can satisfy the requirement.

What is claimed is:

1. A magnetic circuit comprising:
   a cylindrical yoke member having an inner circumferential surface and a collar formed at one end thereof and turned back substantially at right angles; and
   a plurality of permanent magnet segments of a partially circular arc in cross section having respective outer surfaces attracted magnetically to the inner circumferential surface of the cylindrical yoke member and respective one end faces attracted magnetically to the collar of the cylindrical yoke member.

2. The magnetic circuit according to claim 1, wherein the permanent magnet segments are disposed at intervals of 0.05 mm to 0.5 mm.

3. The magnetic circuit according to claim 1, wherein the permanent magnet segments are disposed at intervals of 0.1 mm to 0.3 mm.

4. The magnetic circuit according to claim 1, wherein the permanent magnet segments are formed of a rare earth sintered magnet.

5. An actuator comprising:
   a magnetic circuit comprising:
   a cylindrical yoke member having an inner circumferential surface and a collar formed at one end thereof and turned back substantially at right angles;
   a plurality of permanent magnet segments of a partially circular arc in cross section having respective outer surfaces attracted magnetically to the inner circumferential surface of the cylindrical yoke member and respective one end faces attracted magnetically to the collar of the cylindrical yoke member; and
   a drive coil that cooperate with each other to generate an actuation force.

6. The actuator according to claim 5, wherein the permanent magnet segments are formed of a rare earth sintered magnet.

7. A speaker comprising:
   a magnetic circuit comprising:
   a cylindrical yoke member having an inner circumferential surface and a collar formed at one end thereof and turned back substantially at right angles;
   a plurality of permanent magnet segments of a partially circular arc in cross section having respective outer surfaces attracted magnetically to the inner circumferential surface of the cylindrical yoke member and respective one end faces attracted magnetically to the collar of the cylindrical yoke member; and
   a voice coil and a diaphragm that is joined to the voice coil and vibrated by means of the magnetic circuit and the voice coil in cooperation with each other.

8. The speaker according to claim 7, wherein the permanent magnet segments are formed of a rare earth sintered magnet.

* * * * *